United States Patent [19]
Forsythe

[11] Patent Number: 5,192,597
[45] Date of Patent: Mar. 9, 1993

[54] PROCESS FOR STAGED MULTIPLE YARN WINDING AND RESULTING PRODUCT

[75] Inventor: George D. Forsythe, Landenberg, Pa.

[73] Assignee: E. I. Du Pont de Nemours and Company, Wilmington, Del.

[21] Appl. No.: 631,434

[22] Filed: Dec. 21, 1990

[51] Int. Cl.$^5$ .................. A47G 19/22; B32B 1/08; B32B 5/06; B32B 5/22

[52] U.S. Cl. .................. 428/34.5; 428/34.6; 428/241; 428/302; 428/288; 428/902

[58] Field of Search .......... 424/34.4, 34.5, 225, 424/245, 241, 302, 34.6

[56] References Cited

U.S. PATENT DOCUMENTS

| | | | |
|---|---|---|---|
| 3,902,944 | 9/1975 | Ashton et al. | 156/156 |
| 3,989,471 | 11/1976 | Nowak | 23/288 |
| 4,104,426 | 8/1978 | Gonzalez et al. | 428/36 |
| 4,205,971 | 6/1980 | Abthoff et al. | 55/330 |
| 4,348,439 | 9/1982 | Jones | 428/36 |
| 4,415,613 | 11/1983 | Medney | 428/36 |
| 4,761,323 | 8/1988 | Muhlratzer et al. | 428/198 |
| 4,902,487 | 2/1990 | Cooper et al. | 423/215.5 |
| 4,923,487 | 5/1990 | Bogart et al. | 55/482 |
| 4,925,463 | 5/1990 | Kuhnert | 55/96 |

FOREIGN PATENT DOCUMENTS 0358522 3/1990 European Pat. Off. .

*Primary Examiner*—George F. Lesmes
*Assistant Examiner*—Terrel Morris

[57] ABSTRACT

A process is disclosed wherein a plurality of layers of yarns are laid down in a diamond shaped pattern on a rotating cylindrical mandrel wherein the yarn walls forming the diamond shaped pattern cover the openings of each adjacent layer. The yarns are formed of refractory oxide filaments which are coated with a refractory ceramic to form a filter or trap for removing particulates from combustion exhausts.

4 Claims, 3 Drawing Sheets

PROCESS FOR STAGED MULTIPLE YARN WINDING AND RESULTING PRODUCT

FIELD OF THE INVENTION

The present invention involves a process for winding yarns on a rotating mandrel in successive stages to provide a filter suitable for use as a diesel engine exhaust particulates trap.

BACKGROUND OF THE INVENTION

The U.S. Federal Government is regulating the permissible particulate emissions standards for diesel trucks and buses so that in 1991 for buses and 1994 for trucks the particulate emissions must be below 0.1 grams per brake horsepower hour. There are numerous particulate emissions filter designs which have been patented or are available. However, the presently available particulate emissions filters generally cannot meet the anticipated standards without developing excessive backpressure.

U.S. Pat. No. 4,761,323 discloses a method for the production of soot filters using felt-like bats as the filter elements which are made up of loose refractory fibers. In order to bond the fibers together and anchor them in place the fibers are coated by vapor deposition or precipitation from a solution to give an amorphous coating. Example 8 discloses forming fiber tubes by winching silicon carbide fibers with a diameter of about 12 microns using a multiple yarn eye runner. The yarns were coated with mullite $Al_6Si_2O_{13}$ to provide structural strength U.S. Pat. No. 4,925,463 discloses an exhaust gas cleaning system for diesel engines comprising a filtration device equipped with hollow filter tubes which are closed at one end to provide for gas flow through the thickness of the filter tube walls.

U.S. Pat. No. 4,205,971 discloses a soot filter for the exhaust gas flow from internal combustion engines. The filter includes a cylindrical filter in a housing to provide for gas flow from the external surface of the filter to the hollow interior of the filter.

SUMMARY OF THE INVENTION

The present invention relates to a process for winding yarns sequentially to form a series of layers of diamond shaped openings in turn on a rotating mandrel to form a tubular structure comprising a series of interconnected diamond shaped openings each layer of which interfere with the direct flow of gas from one layer to the next to form a series of small openings which still permit high gas flow through the thickness of the tubular wall formed by such diamond shaped openings while providing contact with a large surface area.

DETAILED DESCRIPTION OF THE DRAWINGS

Figure 1A:
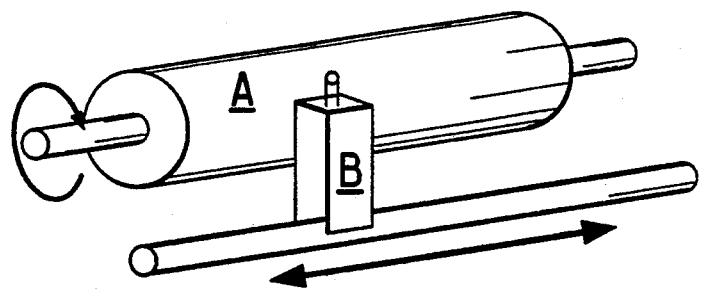
FIG. 1A is a schematic of a winder suitable for use in the present invention.

FIG. 1 depicts a greatly simplified schematic of a winder suitable for practice of this invention. As can be seen in FIG. 1A, the mandrel (chuck) upon which the package will be wound is mounted upon a rotating shaft. A traverse yarn guide holder B is mounted in such a fashion that it may be moved in a reciprocating motion, the main component of which is parallel to the rotational axis of the chuck. This traverse is suitably driven in relationship to the chuck shaft rotation such that the rotation of the chuck shaft makes a fixed small rational number of turns (R) per each complete reciprocation of the traverses. A complete reciprocation shall be considered as starting at any point in the motion and reaching both extremes of endwise position, then returning to the starting position.

Figure 1B:
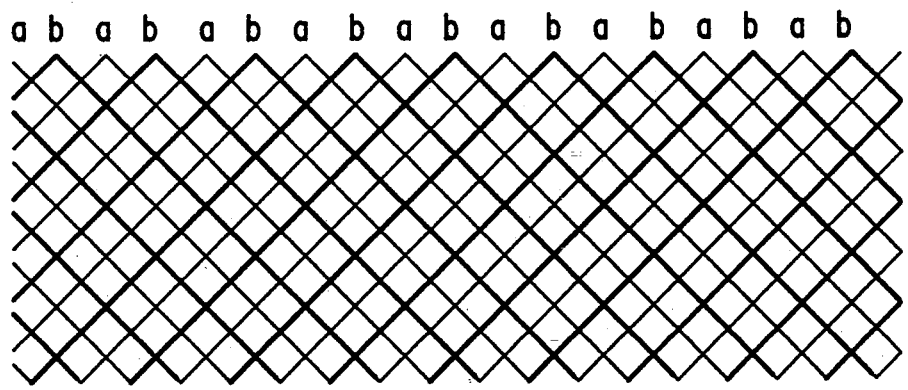
FIG. 1B shows a two yarn laydown pattern used in the present invention.
Figure 1C:
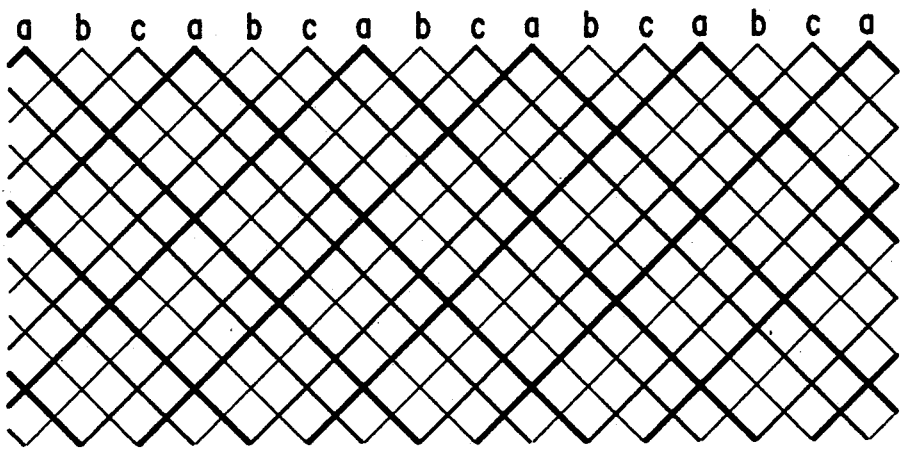
FIG. 1C shows a three yarn laydown pattern used in the present invention.

In practice, the "fixed small rational number of turns per each complete reciprocation of the traverses" specified for the chuck rotation guarantees that in most instances, yarns being carried by the traverse yarn guides will return to exactly overlay itself after a small number of chuck rotations, without having completely covered the surface of the package with a layer of yarn. This results in a package wherein the yarn forms a series of diamond like openings covering the surface of the winding layer. Such "diamonds" and the desirable relationships of their laydown is schematically depicted in FIG. 1B and FIG. 1C. These patterns represent the center lines of the yarns laid down by the traverse moving in its reciprocating path. In FIG. 1B is shown a case where by suitable critical selection or the value of R, the complete covering pattern of diamonds shown is laid down in an ordered way such that all the yarn sets marked by "a" are lain down before any of those marked by "b". These marked by "b" are likewise all in place before the laydown of the next yarn layer occurs superimposed over the "a" marked yarns. We have referred to such a structure as a "2 Bridge" structure. In FIG. 1C is shown a case where by a different selection or the value of R, the complete covering pattern of diamonds shown is laid down in a differently ordered way such that all the yarn sets marked by "a" are lain down before any of those marked by "b" and these are completed before the laydown of the yarns marked by "c". We have referred to this structure analogously as a "3 Bridge" structure. Further different values of R can more extensive or higher number "Bridging" or even the case where all of the yarn pairs are laid down sequentially in order. Such sequential laydown would be referred to as "1 Bridge".

Figure 2A:
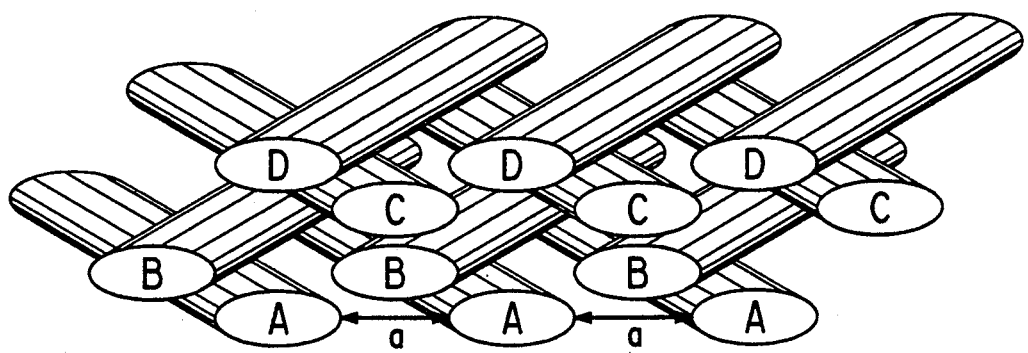
FIG. 2A shows the superposition of four yarn layers in accordance with the present invention.
Figure 2B:
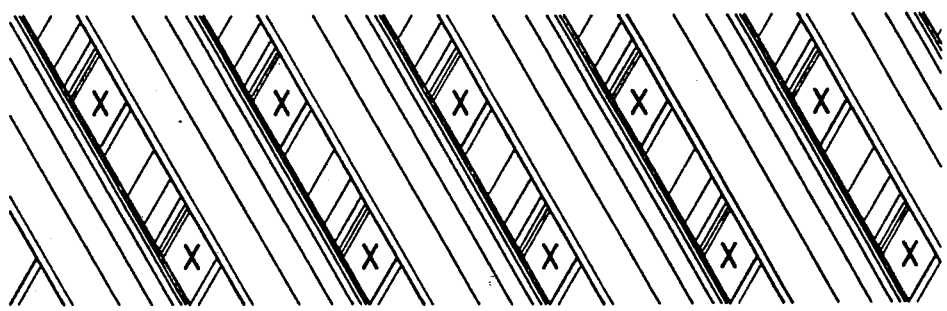
FIG. 2B shows the open spaces formed by overlap of any two lays in accordance with the present invention.
Figure 2C:
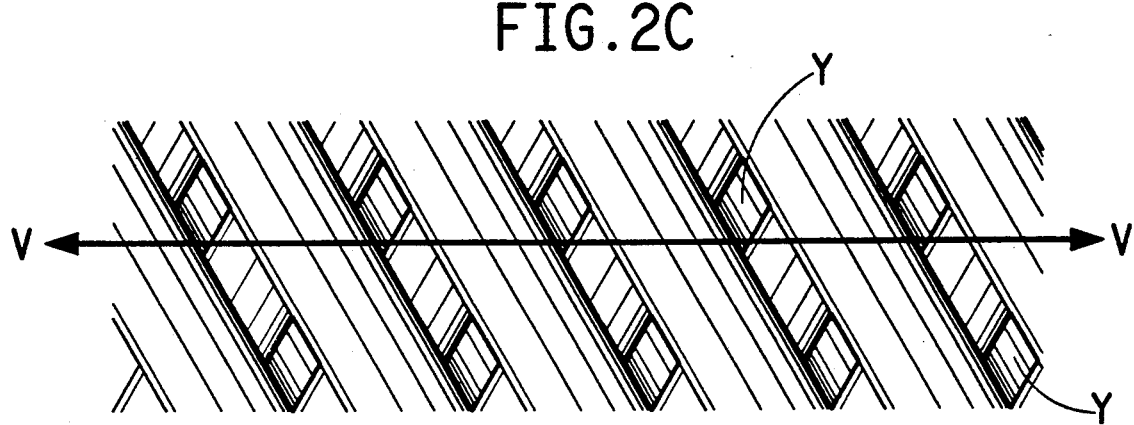

FIG. 2 shows a depiction of the patterns formed in and on the package by several yarn layers in a variant of the "2 Bridge" case. Note that in the perspective representation of FIG. 2A yarns marked by both "A" and "B" together make up the yarns marked by "a" in FIG. 1B similarly yarns marked by both "C" and "D" together make up the yarns marked by "b" in FIG. 1B. This series of layers is repeated many times in the radial direction through the package wall with the yarns of the repeat sets lying essentially "above" their counterparts in the sets below. Any distortion of the pattern which occurs as the package builds is overlooked for reasons of simplification as it does not alter the effect desired. Note that in this Figure th yarns are depicted as nonround in cross section. Such is generally the case in winding of more-or-less loosely twisted multifilament yarn bundles, and such nonroundness can be somewhat controlled by the tightness of the yarn twist. Materials used for this demonstration have been observed to vary from nearly round where the ratio of the longest to shortest axis of this cross section approaches 1.0 to ribbon like yarns where this ratio is as high as 8-10. The shortest axis is always seen to lie essentially in the direction normal to the package surface as wound. In FIG. 2B is shown the projected coverage of any two adjacent yarn layers of this assemblage when the distance "a" in FIG. 2A is less than the largest axis of the yarn cross section. Separation of the yarns allows the formation of openings "X" between adjacent yarns. As the package builds the addition of a third layer either above or below these two layers closes off or obstructs the direct passage through these openings here outlined in heavy lines and marked as "Y" in FIG. 2C. A cross section through this structure along line V—V after more layers are added is depicted in FIG. 3.

Figure 3:
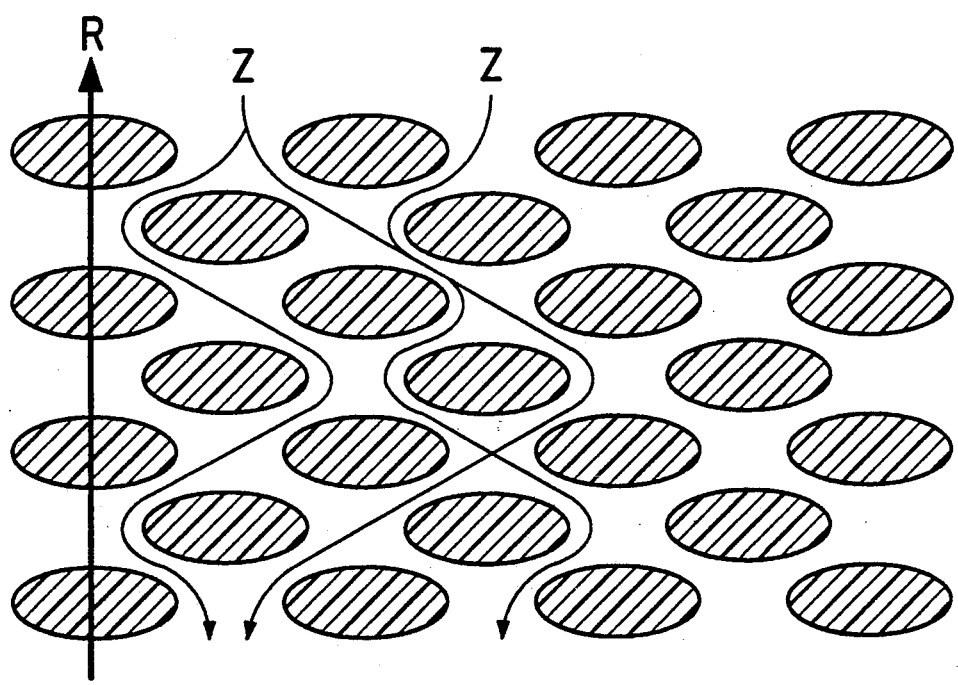
FIG. 3 shows a cross section of a fiber wall taken on line V—V of FIG. 2C.

FIG. 3 shows a simplified drawing of the volume elements present in the package wall. Due to the structure features ellucidated in FIGS. 1 and 2 the yarn elements are seen to lie in such a relationship to each other that no clear passageway remains through the package in the radial direction (R of this Figure). Instead streams of fluid "Z" flowing through the package wall may be variously divided or mixed at each of the interwall spaces, all flow paths having relatively equal ease of flow. Such a flow pattern allows for high turbulence unusually suitable for contact of the fluid streams with catalytic surfaces.

It is important that the yarns of each succeeding layer of diamond shaped patterns are laid down in such a manner that when coated and made into a particulate filter or trap that the walls of each layer cover the diamond shaped openings of each adjacent layer yet leave openings sufficient to provide for the free flow of gases.

When forming a particulate trap for reducing the pollutants contained in exhaust fumes from internal combustion engines, the fibers used herein are ceramic and sufficiently refractory so that yarns thereof do not sag or soften at temperatures below about 750° C., preferably 1000° C.

Suitable such fibers include certain glass fibers such as S glass (high tensile strength glass containing about 24-26% of $Al_2O_3$), "Fiber Fax" and polycrystalline refractory oxide fibers containing more than about 20% by weight $Al_2O_3$ such as the alumina-silica fibers disclosed in U.S. Pat. No. 3,503,765 and certain of the high alumina content fibers disclosed in U.S. Pat. No. 3,808,015 and U.S. Pat. No. 3,853,688. Preferably the fibers contain at least 70 weight percent $Al_2O_3$. Most preferably, the fibers are substantially alumina. The ceramic fibers generally have diameters in the range of 0.2 to 2.0 mils ($0.5-5 \times 10^{-5}$M).

A fiber of a refractory oxide precursor can be used in the winding process of the present invention. These precursor fibers are then converted to polycrystalline refractory oxide fibers by firing to remove volatile matter, change salts to oxides and crystallize the fiber. The preparation of refractory oxide fibers and their precursors is disclosed in U.S. Pat. Nos. 3,808,015 and 3,853,688.

The fibers retain their discrete fibrous form in the product package and are used in the form of yarns, preferably containing 10 to 2,000 or more continuous fibers. Yarns of staple fibers can be used, especially glass. Yarns are not readily made from refractory oxide staple fibers by normal methods, but composite yarns containing short length fibers and a binder or matrix can be used.

A non-porous ceramic binder, when used, serves (1) as a processing aid to hold the yarns in the wound package in place for application of the matrix material and/or (2) to provide additional strength and erosion resistance in the final product. The binders must be of low enough viscosity at firing temperatures to at least partially flow around the ceramic fibers, but of a high enough viscosity not to flow off the yarn structure.

Glasses or crystalline ceramic binders that soften or sinter at temperatures at least 50° C. below the sag temperature of the yarn of ceramic fibers can be used in the form of frits, or, more preferably, the binders may be in the form of a fiber or yarn. The use of a binder in yarn or fiber form affords uniform distribution of the binder throughout the structure and simplifies application because use of a binder in fiber form permits it to be joined with the ceramic fiber which forms the wound package prior to winding on bobbins. Siliceous glasses for this purpose generally contain from 40 to 80 wt% of $SiO_2$ and the preferred siliceous glasses contain at least 20 wt% $Al_2O_3$. More preferably, the glass contains $Al_2O_3$ and MgO in a total amount of 25 to 40 wt%.

The refractory oxide matrix applied to the wound package prepared by the present invention is generally a porous substance having a porosity of from about 20 to 70%. The matrix at least partially surrounds the ceramic fibers and any ceramic binder that may be present. The matrix generally provides some integrity to the fiber configuration so that an adequate level of mechanical strength is provided to the wound package. The matrix also provides an excellent degree of thermal shock resistance because of the inability of the porous matrix to transmit high, thermally induced mechanical stresses to the fibers. The matrix must be sufficiently refractory to withstand the intended temperature of use of the wound package. Thus the matrix should have a softening point above about 1000° C., preferably above about 1400° C. and as high as 2000° C.

The matrix is applied to the bonded or unbonded ceramic fibers in the form of a coating composition which is then fired. Although some chemical changes may occur in the matrix coating composition in addition to loss of volatile materials on firing, the final wound package is a mechanically bound composite structure, substantially devoid of chemical binding forces at yarn-/binder/matrix interfaces.

The coating composition from which the refractory matrix can be derived is generally an aqueous solution, suspension, dispersion, slurry, emulsion, or the like which contains particles of one or more oxides or oxide compounds, a precursor of such an oxide or oxide compound or both. The oxides or oxide compounds (e.g., mullite, spinel) have melting points of at least 1000° C., preferably at least 1,600° C., and as high as 2,800° C. or more.

Examples of suitable refractory oxide precursors which can be used in the coating compositions include alumina hydrate, basic aluminum chloracetate, aluminum chloride and magnesium acetate. Coating compositions containing these materials are converted in situ to a refractory oxide or mixture of oxides by firing.

Preferably, 60 to 90% by weight of the refractory oxide matrix is derived from particles of the oxides (or oxide compounds) in the coating composition and 10 to 40% by weight from particles of a refractory oxide precursor. The particles should be less than 20 microns in diameter (and more preferably less than 2 microns) to aid penetration into voids between fibers.

The composition of the coating must be such that fluxing with the binder is avoided at firing and in-use temperatures.

In general, the coating composition can be selected from known ceramic or refractory compositions and cements with the above requirements in mind. Preferably, the coating composition should yield a refractory oxide matrix containing at least 40% by weight of alumina with the other oxides being selected from those of the metals of Group IIA and Group IVB of the Periodic Table, such as BaO, CaO, MgO, $ZrO_2$ and $TiO_2$.

Preferably, the coating composition is uniformly distributed around the fibers of the yarn. The distribution is affected by the viscosity of the coating composition, the method of application, the density (or tightness) of the yarn bundle, the nature of the yarn and the amount of the coating composition. The composition should have a viscosity that is low enough to permit flow and some penetration into voids in the yarn but high enough to facilitate adhesion to the yarn bundle.

When the yarn contains no refractory oxide precursor fibers, the coating composition is preferably applied in an amount calculated as refractory oxide matrix of 20 to 50% by weight of the final structure, to the yarn before winding the yarn to form the wound package to provide uniform distribution of the coating. The coating compositions which conveniently are aqueous dispersions or solutions can be applied to the yarn in many ways such as immersion of the yarn in a bath, use of a finish roll, spraying, etc. All or part of the coating composition can be applied, if desired, after the wound package has been prepared.

The firing at any stage of the process is determined by the function of that stage.

1. Conversion of precursor fibers

When a yarn of refractory precursor oxide fibers is used to form all or part of the wound package, such a yarn requires a relatively low firing temperature (e.g. 350° C. to 800° C.) to remove most volatiles and develop strength. A high firing temperature (e.g., 1300° to 1500° C.) consolidates the fiber and gives it greater strength. This can be done stepwise or in one continuous slow firing.

2. Establishing bonds from binder

When a binder in the form of a fiber is plied with the ceramic fiber which forms the wound package, the composite yarn can be fired at a temperature relatively close to the softening or sintering point of the binder fibers to produce partial flow or sintering or at a higher temperature for more complete flow. For example, wound packages of S glass binder fibers and alumina ceramic fibers can be fired at about 1000° C. or 1540° C. to obtain, respectively, the partially melted bond or the completely melted bond. The nature of the glass bonds depends on the type of glass and the firing temperatures used. It is a characteristic of as-spun refractory oxide precursor fibers that they shrink linearly from 15 to 25% upon being heated to about 550° C. Glass fibers generally show no shrinkage at this temperature so that firing below the melting point of the glass causes shrinkage of the precursor and results in a "glass-rich" surface which can improve erosion resistance.

3. Conversion of coating composition to refractory oxide matrix

The wound package containing the coating composition is dried and then fired to set the composition and form the matrix. Typical coating compositions require temperatures of from 350° to 900° C. to remove most volatiles and develop crystallinity and strength in the matrix. At these temperatures, precursors in the coating compositions are converted to the corresponding oxides (e.g. alumina). Under some circumstances, e.g. high precursor level in the coating composition, the firing may produce small cracks in the coating composition due to shrinkage. These can be "healed" by applying one or more additional applications of the coating composition to the wound package, with drying and firing between coats. Such additional applications increase the resistance of the wound package to sagging or distortion during high temperature firing, especially when fired unsupported in the vertical position.

It may be desirable to fire the wound package above 900° C. to further increase the strength and crystallinity of the refractory oxide matrix. The maximum temperature should be less than 1200° C. if the wound package contains more than 15 Wt% silica in either fibers or matrix because the silica may start to crystallize to cristobalite at 1200° C. Excess cristobalite is undesirable since cristobalite undergoes a volume change at 200° to 270° C. which contributes to poor thermal shock resistance. The finished articles should contain no more than 15 wt% cristobalite and preferably less than 5 wt%.

Optionally, additional coating composition can be added to the high fired, coated, wound package in an amount sufficient to provide a refractory oxide matrix comprising 5 to 25 wt% of the ultimate product wound package after heating at 900° C. Such ultimate products are good substrates for catalysts.

A preferred yarn uses siliceous glass fibers comprising 61-66 wt% $SiO_2$, 24-26 wt% $Al_2O_3$ and 9-15 wt% MgO. A coating composition consisting essentially of alumina and an alumina precursor is applied to the yarn in an amount sufficient to provide a refractory oxide matrix comprising 27 to 34 wt% of the final wound package product before the yarn is wound to form the wound package. The wound package is dried at about 150° C., heated to about 600° C., held at that temperature for about 45 minutes and cooled. Additional alumina coating composition is applied in an amount to provide a refractory oxide matrix comprising 9-12 wt% of the final wound package product and the wound package product is dried at 150° and then high fired at 900° to 1150° C. in a period of 2, 5 to 8 hours, held at the maximum temperature for ¼ to 24 hours and cooled. Preferably, all of the coating composition is applied before the package is wound to provide a final wound package containing 36 to 46 wt% refractory oxide matrix.

The wound package products of the invention are useful as elevated temperature particulate traps for exhaust gases where the gas flows laterally through the porous walls of the wound package product to contact a large surface area of the wound package product.

Another preferred class of products, characterized by good erosion resistance, contain 15 to 40 wt% of fused glass as the ceramic fiber binder and 15 to 60 wt% of a refractory oxide catalyst.

I claim:

1. A hollow cylindric al package having a wall through which gases flow, said wall formed of a plurality of layers of yarns laid down in a diamond shaped pattern wherein each layer is formed of a fixed small number of superposed yarns forming the walls of the diamonds and the yarns forming the walls of the diamonds of each layer completely cover the diamond shaped openings of each adjacent layer to form a series of diamond shaped openings, each layer of which interferes with direct flow of ga from one layer to the next layer, yet leave openings sufficient to provide for dividing and mixing of the gases flowing from one layer to the next layer.

2. The package of claim 1 wherein the yarns are formed of a plurality of refractory inorganic filaments.

3. The package of claim 2 in the form of a filter wherein the yarns are coated with a ceramic binder having a softening point above 1000° C.

4. The filter of claim 3 wherein the ceramic coating has a softening point above 1600° C.

* * * * *